April 14, 1936.    R. J. TEETOR    2,037,184
CLAMP
Filed Sept. 4, 1934    3 Sheets-Sheet 1
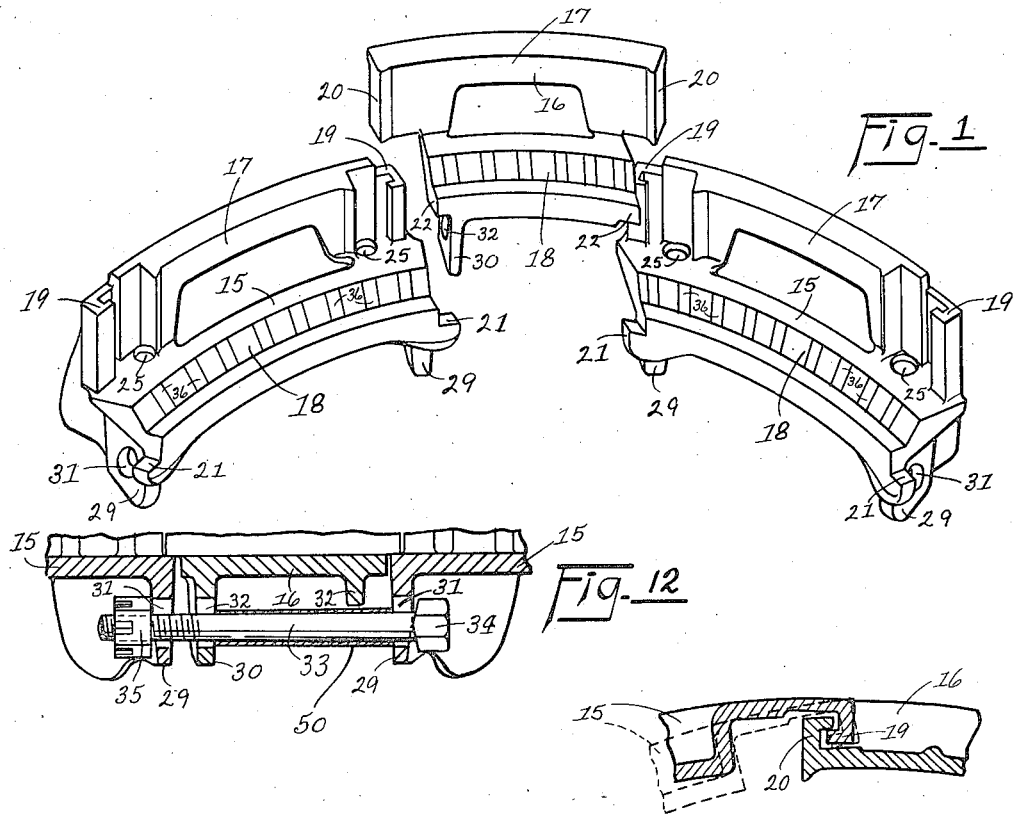
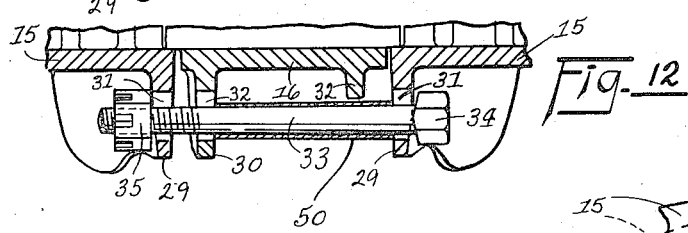
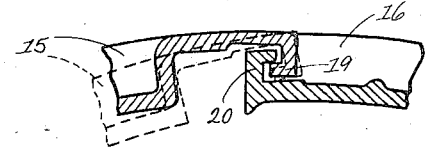
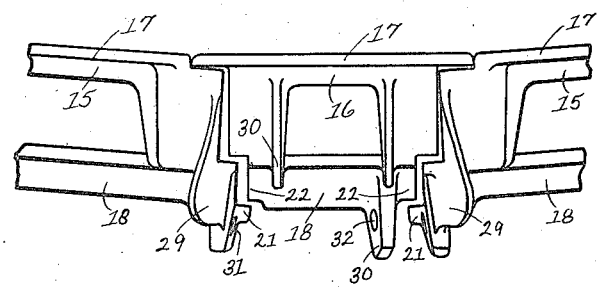
Inventor
Ralph J. Teetor
Witness:
Geo L. Chapel
By Rice and Rice
Attorneys

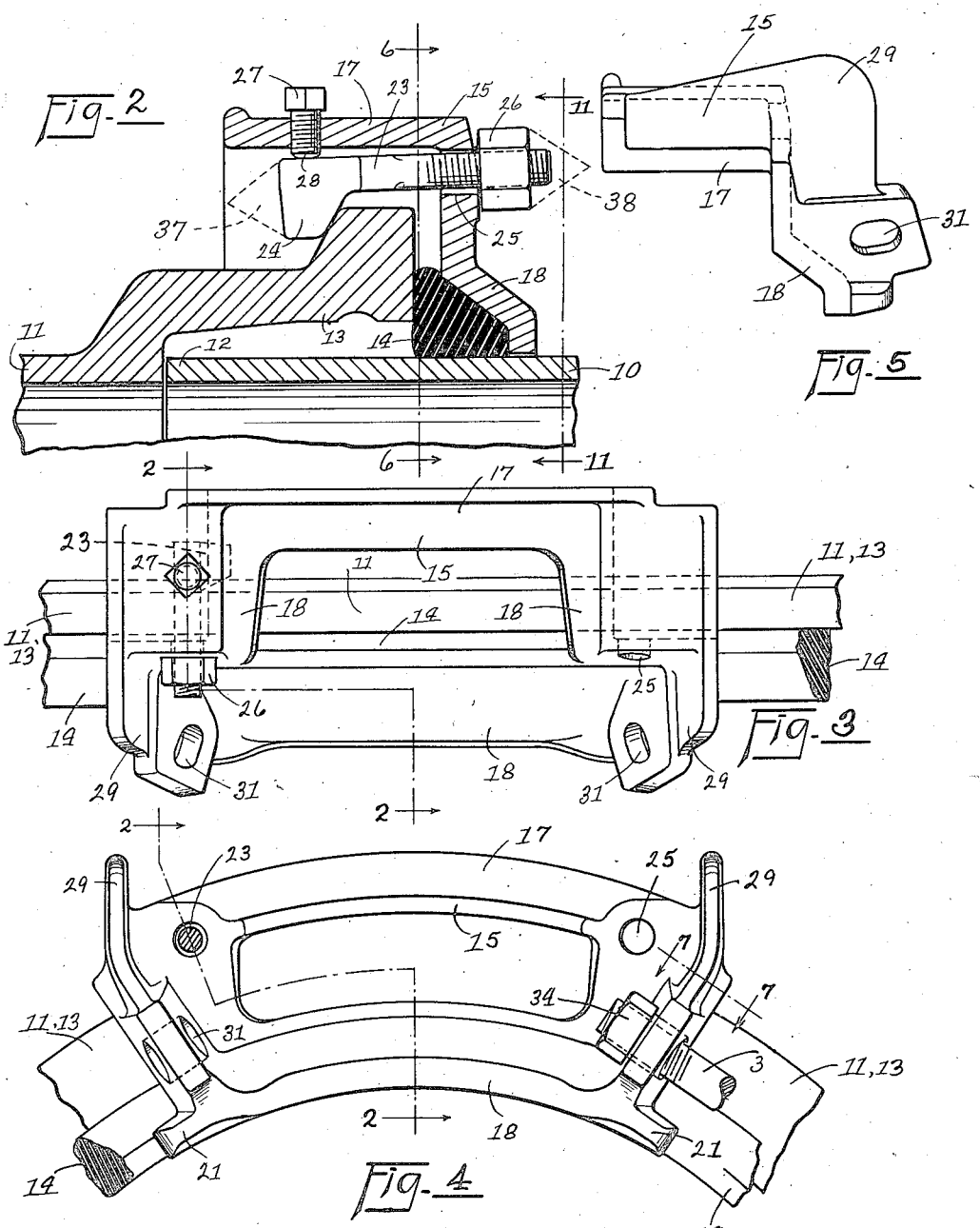

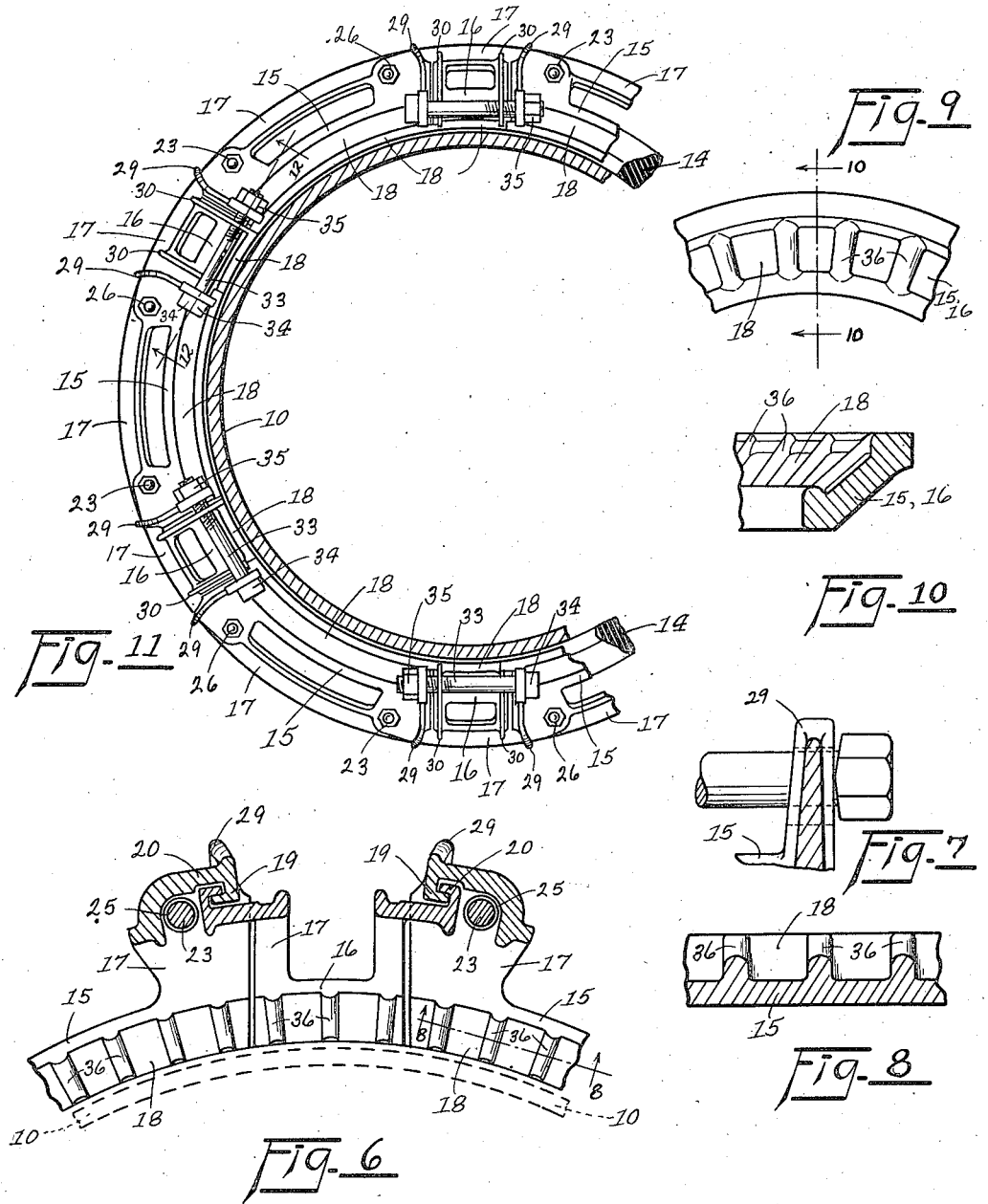

Patented Apr. 14, 1936

2,037,184

UNITED STATES PATENT OFFICE 2,037,184

CLAMP

Ralph J. Teetor, Cadillac, Mich.

Application September 4, 1934, Serial No. 742,611

6 Claims. (Cl. 285—119)

The present invention relates to clamps and more particularly to clamps for sealing pipe lengths having bell and spigot connecting ends against leakage at their joints. The invention relates to clamps of the general character shown, described and claimed in my co-pending application, Serial No. 740,251, filed August 17, 1934, but the instant invention relates to certain other features now shown or shown but not claimed in my said co-pending application.

The principal objects of the instant invention are to provide a clamp of the character above indicated made up from a plurality of segmental links or arcuate sections whose several links or sections are retained together by independent means; to provide such a clamp whose several links or sections are loosely interlocked together and are thus flexibly connected and retained together for adjustably embracing circumferential differences of the spigot end of standard pipe diameters and for adjustably embracing irregular surfaces of the bell end of standard pipe; to provide such a clamp whose alternate links or sections are retained together and whose intermediate links or sections are interlockingly secured to the alternate links or sections and thus "float" therebetween for adjustably embracing circumferential differences of standard pipe diameters; to provide such a clamp whose several links or sections are provided with laterally projecting electrolytic responsive fins or ears; to provide such a clamp whose packing ring is tensionally engaged through tightening bolts having ends provided with electrolytic responsive portions; and, to provide such a clamp having a corrugated or otherwise irregular surface tensionally engaging the packing ring to better effect a more perfect seal.

Illustrative embodiments of the invention are shown in the accompanying drawings, in which:—

Figure 1 is a perspective view of three of the segmental links or arcuate sections showing the manner in which they may be interlockingly detachably secured together, each alternate segmental link or arcuate section being identically formed at each of its interlocking ends;

Figure 2 is a sectional view of one of the alternate segmental links or arcuate sections on lines 2—2 of Figures 3 and 4;

Figure 3 is an elevational view of one of the segmental links or arcuate sections;

Figure 4 is another elevational view of the segmental link or arcuate section shown in Figure 3 turned rearwardly from the position shown in Figure 3;

Figure 5 is an end view of the segmental link or arcuate section of the link shown in Figures 3 and 4;

Figure 6 is a sectional view on line 6—6 of Figure 2;

Figure 7 is a sectional view on line 7—7 of Figure 4 but showing a fragmentary portion of a bolt in the bolt receiving slot;

Figure 8 is a sectional view on line 8—8 of Figure 6;

Figure 9 is a fragmentary view of a segmental link or arcuate section having a modified form of the packing ring engaging the surface;

Figure 10 is a sectional view thereof on line 10—10 of Figure 9;

Figure 11 is a sectional view on line 11—11 of Figure 2 and showing a plurality of the segmental links or arcuate sections of the clamp in their interlocked detachably secured and retained relation;

Figure 12 is a sectional view on line 12—12 of Figure 11, but including a sleeve to protect the bolt against corrosion;

Figure 13 is a fragmentary sectional view of a pair of segmental links or arcuate sections of the clamp in their flexibly interlocked relation; and Figure 14 is a fragmentary perspective view showing a plurality of the segmental links or arcuate sections of the clamp in their flexibly interlocked relation.

The clamping structures herein shown and to be presently described are particularly adapted for use for the re-sealing of previously laid cast iron pipe links forming gas mains and the like having bell and spigot connecting ends and whose original sealing has become defective.

Referring then to the drawings in which like parts of the structure shown are designated by the same numerals in the several views, two lengths of pipe 10, 11 have bell and spigot connecting ends 12, 13 respectively and a resilient packing ring 14 of rubber or the like disposed adjacent the connecting ends of the pipe lengths.

The clamp comprises a plurality of segmental links or arcuate sections whose alternate links or sections 15 are here shown as identically formed and whose intermediate links or sections 16 are likewise here shown as identically formed. These links or sections 15, 16 each have a portion 17 adapted to embracingly conduct the peripheral surface of the bell end of the pipe length 11 and have a flanged portion 18 adapted to overhang the bell end of the pipe length 11 and to engage the resilient packing ring 14.

The portion 17 of each link or section 15 at each end thereof is provided with a forwardly turned hooked portion 19 and the portion 17 of each link or section 16 at each end thereof is provided with a rearwardly turned hooked portion 20, all as best shown in Figures 1, 6 and 13. The flanged portion 18 of each link or section 15 at each end thereof is provided with an upwardly turned hooked portion 21 and the flanged portion 18 of each link or section 16 is provided with a downwardly turned hooked portion 22, all as best shown in Figures 1 and 14. The several segmental links or arcuate sections may thus be detachably interlocked together as best shown in Figures 1 and 11, the portion 16 embracingly contacting the peripheral surface of the bell end of the pipe length 11 and the flanged portion 18 overhanging the bell end of this pipe and in engagement with the resilient packing ring 14.

Tightening means for effecting pressure on the packing ring 14 to seal the pipe joint between the two lengths of pipe 10, 11 is here shown as comprising the bolts 23 having offset heads 24 engaging the inner side of the bell end of the pipe and passing through the bolt apertures 25 at each end of each alternate link or section 15.

A nut 26 is provided for the end of each bolt 23 which when tightened causes the flanged portion 18 of each alternate link 15 and the flanged portion of each interlocked intermediate link 16 to tensionally engage and effect pressure against the packing ring 14 whereby the pipe joints between the several lengths of pipe may be effectively sealed. A set screw 27 whose inner end 28 is adapted to bear against the head of the bolts 23 when the set screw is tightened, better effects engagement of the bolt head 24 against the bell end portion of the pipe length 11 as best shown in Figure 2.

The alternate links or sections 15 are provided with integrally formed laterally disposed electrolytic fins or ears 29 at each end thereof and each intermediate link or section 16 is provided with integrally formed laterally disposed fins or ears 30. These fins or ears 29, 30 are provided because the outer ends of buried pipe clamps are more responsive to electrolytic action than are intermediate portions of the clamp. Since it is less important that these fins or ears wear away or wear out through electrolytic action than other parts of the links or sections, these fins are thus provided.

These fins or ears 29 and one of the fins 30 of each pair are provided with aligned bolt receiving apertures 31, 32 respectively, here shown as slotted, and bolts 33 having heads 34 are passed through the aperture 32 of the fin of each intermediate link 16 and through the opposite aperture of the fin of each adjacent link 15. By tightening the nut 35, independent means for detachably securing the links or sections together is provided, and a sleeve 50 for the bolt 33 may be used if desired to protect the bolt against corrosion (see Figure 12).

Now the interlocking connections of the several links or sections are preferably relatively loose joint connections and since the bolts 33 merely positively secure the alternate links 15 together and since the intermediate links 16 "float" therebetween, because there is no pull by the bolt 33, there is a certain flexibility of the clamp at the interlocking joint connections between the several links or sections. This flexibility between the several links and the "floating" of the intermediate links 16 permits wide adjustability as to the range in circumferential differences of standard pipe diameters. Thus by tightening the bolts 33 passing through aligned slotted bolt apertures, flattened pipe and/or imperfect bell ends may be more effectively sealed. The fins 29 are likewise preferably bevelled as best shown in Figures 7, 12 so that the bolts 33 may effect a better tensional engagement when tightened.

Further provision for effecting the sealing of the joint connection between several lengths of pipe is provided with the use of corrugations 36 or other irregularities on the packing ring engaging surface. This corrugated surface distorts the resilient packing ring and distributes pressure thereon at closely spaced points. Imperfect joints may thus be more effectively sealed.

The ends of the bolts 23 may likewise be provided with heads and nuts having tapered or elongated ends 37, 38 respectively as indicated in dotted lines in Figure 2. These tapered or elongated ends are provided for the same reason as are the fins or ears 29, 30.

It will thus be seen that a clamp formed of a plurality of flexibly interlocking and detachably secured segmental links or arcuate sections has been herein shown and described which is particularly adapted for use in re-sealing joints of old pipe lengths whose original sealing has become defective over a period of time and that the clamp herein shown and described has many novel attributes.

While but several embodiments of this invention have been herein shown and described, it will be understood that numerous details of the constructions shown may be altered or omitted without departing from the spirit of this invention as defined by the following claims.

I claim:

1. A clamp for sealing pipe lengths having bell and spigot connecting ends against leakage at their joints comprising a plurality of detachably connected segmental links, each of said links having a flanged portion adapted to overhang the bell end portion of a pipe length and to engage a packing ring disposed adjacent the connecting ends of the pipe lengths, each alternate link having a fin at its opposite ends and each fin being provided with a bolt receiving aperture, each intermediate link having a fin provided with a bolt receiving aperture, a bolt passing through the aperture of each intermediate link and through the opposite aperture of each alternate link for detachably securing the links together, and tightening means operatively associated with each alternate link adapted to tensionally engage against the bell end portion of the pipe length for effecting pressure on the packing ring to seal the pipe joint between the two lengths of pipe.

2. A clamp for sealing pipe lengths having bell and spigot connecting ends against leakage at their joints comprising a plurality of detachably connected segmental links, each of said links having a flanged portion adapted to overhang the bell end portion of a pipe length and to engage a packing ring disposed adjacent the connecting ends of the pipe lengths, each alternate link having a fin at its opposite ends and each fin being provided with a bolt receiving slotted aperture, each intermediate link having a fin provided with a bolt receiving slotted aperture, a bolt passing through the aperture of each intermediate link and through the opposite aperture of each alternate link for detachably securing the links together, and tightening means operatively associated with each alternate link adapted to tensionally engage against the bell end portion of the pipe length for effecting pressure on the packing ring to seal the pipe joint between the two lengths of pipe.

3. A clamp for sealing pipe lengths having bell and spigot connecting ends against leakage at their joints comprising a plurality of flexibly interlockingly connected segmental links, each of said links having a flanged portion adapted to overhang the bell end portion of a pipe length and to engage a packing ring disposed adjacent the connecting ends of the pipe lengths, each alternate link having a fin at its opposite ends and each fin being provided with a bolt receiving slotted aperture, each intermediate link having a fin provided with a bolt receiving slotted aperture, a bolt passing through the aperture of each intermediate link and through the opposite aperture of each alternate link for detachably securing the links together, and tightening means operatively associated with each alternate link adapted to tensionally engage against the bell end portion of the pipe length for effecting pressure on the packing ring to seal the pipe joint between the two lengths of pipe.

4. A clamp for sealing pipe lengths having bell and spigot connecting ends against leakage at their joints comprising a plurality of detachably connected segmental links, each of said links having a flanged portion adapted to overhang the bell end portion of a pipe length and to engage a packing ring disposed adjacent the connecting ends of the pipe lengths, each alternate link having a beveled fin at its opposite ends and each fin being provided with a bolt receiving aperture, each intermediate link having a fin provided with a bolt receiving aperture, a bolt passing through the aperture of each intermediate link and through the opposite aperture of each alternate link for detachably securing the links together, and tightening means operatively associated with each alternate link adapted to tensionally engage against the bell end portion of the pipe length for effecting pressure on the packing ring to seal the pipe joint between the two lengths of pipe.

5. A clamp for sealing pipe lengths having bell and spigot connecting ends against leakage at their joints comprising a plurality of detachably connected segmental links, each of said links having a flanged portion adapted to overhang the bell end portion of a pipe length and to engage a packing ring disposed adjacent the connecting ends of the pipe lengths and each link having a laterally projecting fin, independent means for detachably securing the links together, tightening means operatively associated with each alternate link adapted to tensionally engage against the bell end portion of the pipe length for effecting pressure on the packing ring to seal the pipe joint between the two lengths of pipe, and a set screw adapted to bear against said tightening means for better effecting engagement of the tightening means against the bell end portion of the pipe length.

6. A clamp for sealing pipe lengths having bell and spigot connecting ends against leakage at their joints comprising a plurality of detachably connected segmental links, each of said links having a flanged portion adapted to overhang the bell end portion of a pipe length and to engage a packing ring disposed adjacent the connecting ends of the pipe lengths, each alternate link having a fin at its opposite ends and each fin being provided with a bolt receiving aperture, each intermediate link having a fin provided with a bolt receiving aperture, a bolt passing through the aperture of each intermediate link and through the opposite aperture of each alternate link for detachably securing the links together, a sleeve for said bolt to protect the bolt against corrosion, and tightening means operatively associated with each alternate link adapted to tensionally engage against the bell end portion of the pipe length for effecting pressure on the packing ring to seal the pipe joint between the two lengths of pipe.

RALPH J. TEETOR.